United States Patent [19]
Palilla et al.

[11] 3,931,390
[45] Jan. 6, 1976

[54] CATALYTIC PROCESS FOR REMOVING SULFUR DIOXIDE FROM GAS STREAMS

[75] Inventors: Frank C. Palilla, Framingham; Gary G. Gaudet; Helmut Lingertat, both of Dorchester, all of Mass.

[73] Assignee: GTE Laboratories Incorporated, Waltham, Mass.

[22] Filed: Nov. 18, 1974

[21] Appl. No.: 524,855

[52] U.S. Cl. .................. 423/244; 423/570; 252/462
[51] Int. Cl.² ...................... C01B 17/00; B01J 8/00
[58] Field of Search .................. 423/242–244, 423/564, 570, 573; 252/462

[56] References Cited
UNITED STATES PATENTS

| | | | |
|---|---|---|---|
| 3,856,925 | 12/1974 | Kodera et al. | 423/574 |
| 3,864,459 | 2/1975 | Stiles | 423/564 |
| 3,885,020 | 5/1975 | Whelan | 423/245 |

*Primary Examiner*—Oscar R. Vertiz
*Assistant Examiner*—Gregory A. Heller
*Attorney, Agent, or Firm*—Irving M. Kriegsman

[57] ABSTRACT

This application describes a process for the catalytic reduction of sulfur dioxide in gas streams containing sulfur dioxide to elemental sulfur using a reducing gas such as hydrogen or, preferably, carbon monoxide, and a catalyst of the formula $Ln_2O_3 \cdot Co_2O_3$, where Ln is either Y or Gd.

21 Claims, 1 Drawing Figure

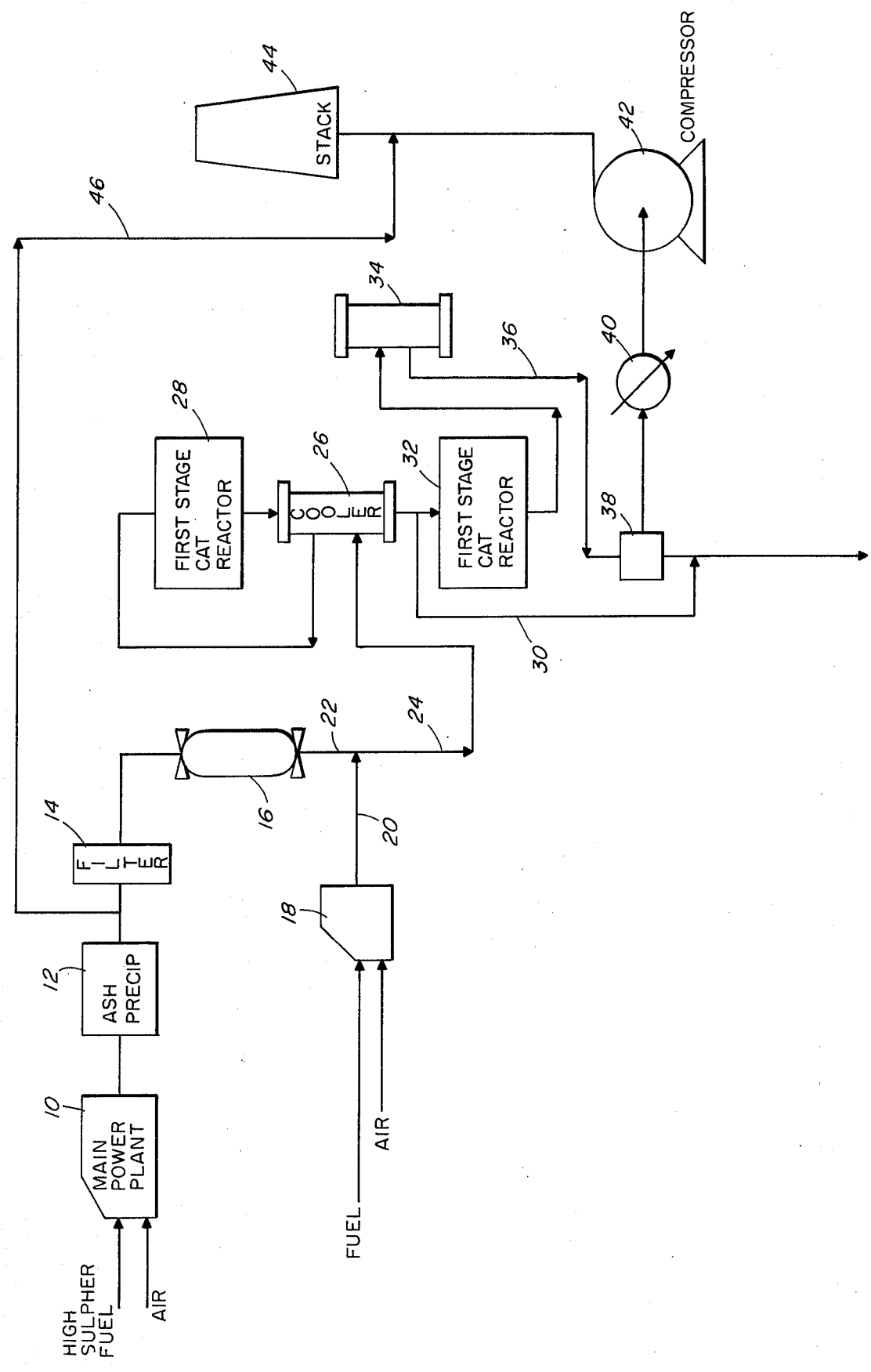

CATALYTIC PROCESS FOR REMOVING SULFUR DIOXIDE FROM GAS STREAMS

FIELD OF THE INVENTION

This invention relates to the removal of sulfur dioxide from gas streams containing sulfur dioxide. More particularly, this invention relates to the catalytic reduction of sulfur dioxide with a reducing gas, preferably carbon monoxide, to elemental sulfur in gas streams containing sulfur dioxide, such as flue or stack gases, gases resulting from oil or coal gasification which contain sulfur dioxide, smelter gases, etc.

BACKGROUND OF THE INVENTION

Sulfur dioxide is a constituent of many waste gases, such as, for example, smelter gases, flue gases, off gases from chemical manufacturing processes, ore roaster gases, and stack gases from coal- and oil-burning furnaces and boilers. Contamination of the atmosphere by sulfur dioxide, whether present in dilute concentrations of 0.05 to 0.3 volume percent as in power plant flue gases or in higher amounts of 5 to 10 percent as in ore roaster gases, has been a public health problem for many years due to its irritating effect on the respiratory system, its adverse affect on plant life, and its corrosive attack on many metals, fabrics and building materials. Millions of tons of sulfur dioxide are emitted into the atmosphere each year in The United States due to combustion of fuel oil and coal; a major amount of such sulfur dioxide being produced in the generation of electric power.

Since the reduction of the sulfur dioxide content of stack gases is the key to the production of useful energy from our abundant fuels (coal and high sulfur oil) in an environmentally acceptable manner, many methods have been proposed, and are presently under study, for the removal of sulfur dioxide from such gases. It is estimated that there are close to 50 sulfur dioxide removal processes presently under investigation in the United States. While the processes appear technically feasible, the expense of the sulfur dioxide removal is substantial. Some of the more common processes involve scrubbing of the stack gas and precipitation of the sulphur dioxide with limestone as calcium sulfite or, following oxidation, as calcium sulfate. Scrubbing of the very large effluent gas quantities, as well as collection and disposal of the solid precipitate from the scrubbing liquid, are expensive.

An inherently less expensive method for removing the sulfur dioxide is based on the catalytic reduction thereof with carbon monoxide or some other reductant. Neither scrubbing of a gas by a liquid nor the separation of a solid from a liquid are required in this method. This method has been tried with many different catalysts but, to date, to the best Applicant's knowledge, such methods have one or more of three major difficulties. Initially, burners, such as those operated by electrical power generation, run on fuel mixes with excess air or "lean fuel mixes". This is done to prevent the formation of explosive carbon dust and to derive more energy from the fuel. As a result of the use of the lean fuel mix, the stack gas is rich in oxygen. This oxygen poisoned many of the catalysts tried in the past, thus killing the catalytic activity thereof and reducing the overall effectiveness of the reduction process. Secondly, certain of the catalysts utilized catalyzed the reduction of water by carbon monoxide to form carbon dioxide and hydrogen, or catalyzed the reaction of water and sulfur to hydrogen sulfide and oxygen. Hydrogen reacts with sulfur to form hydrogen sulfide at temperatures as low as about 200°C, and, thusly, in either case, the sulfur dioxide is converted into another toxic material. Thirdly, certain of the non-specific catalysts catalyzed the oxidation of carbon monoxide to sulfur to form carbonyl sulfide, another highly toxic gas. These difficulties arise because of the non-specific nature of the catalytic material.

OBJECTS OF THE INVENTION

It is, therefore, the primary object of this invention to define a novel process for the removal of sulfur dioxide from gas streams containing sulfur dioxide.

It is a further object of this invention to provide a process for the catalytic reduction of sulfur dioxide to elemental sulfur.

It is a further object of this invention to provide a process for the catalytic reduction of sulfur dioxide in gas streams containing sulfur dioxide to elemental sulfur using specific catalytic compositions which are not subject to poisoning by oxygen or water, and are less subject to the aforementioned deficiencies.

It is a further object of this invention to provide a process for the catalytic reduction of sulfur dioxide by a reducing gas to elemental sulfur, said process being sufficiently specific to operate with lean fuel mixtures while forming environmentally acceptable levels of sulfur dioxide, hydrogen sulfide, or carbonyl sulfide.

These and still further objects, advantages and features of the present invention will become apparent upon consideration of the following detailed disclosure.

SUMMARY OF THE INVENTION

These and still further objects, features and advantages of the present invention are achieved, in accordance therewith, by utilizing a composition represented by the formula $Ln_2O_3 \cdot Co_2O_3$, where Ln is either Y or Gd, as the catalyst in the catalytic reduction of sulfur dioxide with a reducing gas, such as hydrogen or, preferably, carbon monoxide, in sulfur-dioxide containing gas streams to elemental sulfur. Catalysts having a 1 : 1 ratio of cobalt oxide to either $Y_2O_3$ or $Gd_2O_3$ are preferred since maximum catalytic conversion efficiencies are obtainable therewith. Other ratios, if reasonably close to preferred 1 : 1 ratio, are suitable since the desired catalytic conversion to elemental sulfur is effected.

In its broadest aspects, the process of the present invention is directed to the removal of sulfur dioxide from any sulfur dioxide-containing gas stream where the above-identified catalyst is used and a reducing gas, such as hydrogen or, preferably, carbon monoxide, is added to, or present in sufficient quantities in, the sulfur dioxide-containing gas stream to within about 35 15%, generally about 35 10%, of the stoichiometric amount required for complete reduction of all sulfur dioxide present to elemental sulfur. If the amount of reducing gas in the stream is sufficient, no further amount need be added thereto. However, quantities of the reducing gas can be added, or generated in situ, as necessary to provide the desired amount of reductants, relative to oxidants, in the gas stream.

The first, and presently considered to be the most important aspect of the present invention is a process directed to the removal of sulfur dioxide from sulfur dioxide-containing flue or stack gases, especially those resulting from coal-burning processes, oil burning processes, or any other process which produces sulfur dioxide in the tail gas. Of special interest is the particularly severe case of a stack gas resulting from a coal-burning operation where the stack gas contains fly ash (to the extent not removed by precipitation) and generally has a composition of about 0.32% $SO_2$, 3.2% $O_2$, 15% $CO_2$, 7.6% $H_2O$, 0.12% nitrogen oxide, balance nitrogen, i.e., where the $O_2/SO_2$ ratio is about 10:1 and the $H_2O$ content is very high (which could lead to $H_2S$ formation), to which is added about 7.2% CO. Since the fly ash that remains and other components (including oxygen) of the gas stream do not "poison" the catalytic material of this process, it is effective to remove the sulfur dioxide as desired. It is contemplated that the catalyst will work even better with gas streams, such as those from oil burning operations, where the $O_2/SO_2$ ratio is more favorable and the level of fly ash is much lower.

In further aspects of the invention, the process of the present invention is considered applicable to other applications where the gas stream has a higher $SO_2$ content and a lower $O_2$ content, such as those gas streams resulting from ore roasting, coal processing plants where coal is converted to gas and/or oil, or scrubbing systems where absorbed sulfide is oxidized to $SO_2$ to give a concentrated $SO_2$-containing gas stream, etc. Typical gas concentrations contemplated here would be about 3–20% $SO_2$, 1–5% $O_2$, a few % $H_2O$, with the balance $N_2$. The $SO_2$ in such a gas stream would be catalytically reduced, as taught herein, to elemental sulfur and any $H_2S$ formed, even in appreciable amounts, could be recycled through the catalytic reactor. Such $H_2S$ formation would not be prohibitive since the bulk of the high concentration of the sulfur dioxide would be removed from the stream.

Reduction to elemental sulfur proceeds according to the known reactions:

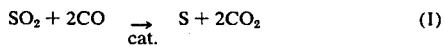

$$SO_2 + 2CO \xrightarrow{cat.} S + 2CO_2 \quad (I)$$

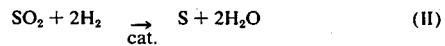

$$SO_2 + 2H_2 \xrightarrow{cat.} S + 2H_2O \quad (II)$$

The important considerations in such processes relate to the reduction (and continued reduction) of the sulfur dioxide although oxygen, nitrogen oxides and other reducible components are present, the possible reduction of sulfur dioxide to hydrogen sulfide in the presence of water, the possible reduction to carbonyl sulfide by direct reaction between carbon monoxide and the sulfur dioxide, and the formation of hydrogen sulfide and carbonyl sulfide by reaction of the gaseous sulfur, produced in the principal reduction step, with other components present in the gas stream. In tests conducted to date with gas streams which have high $SO_2$ levels to which have been added or generated in situ carbon monoxide to increase the concentration thereof to not greater than the stoichiometric amount required to reduce all of the oxygen and sulfur present, it has been determined that the reduction of oxygen is favored over the reduction of sulfur dioxide (in the presence of oxygen), but the sulfur dioxide reduction is not excluded while oxygen is present; thus, in the presence or absence of oxygen, substantially complete reduction of the sulfur dioxide to elemental sulfur can be effected at temperatures below 700°C, generally between 450°C and 650°C; the presence of water at the elevated reaction temperatures does not lead to the formation of unacceptable hydrogen sulfide; and carbonyl sulfide is not formed in appreciable amounts in the reduction process (unless the feed gas contains carbon monoxide in concentrations greater than the stoichiometric amount required to reduce all of the oxygen and sulfur dioxide). In addition, in the presence of water, the formation of carbonyl sulfide is further inhibited. The present process, therefore, as it pertains to gas streams having high $SO_2$ levels, affords distinct advantages over known processes of which Applicant is aware since, in a single stage (though multiple stages are contemplated), with a temperature requirement of less than 700°C, the sulfur dioxide is converted to elemental sulfur with a conversion efficiency greater than about 90% while forming not greater than minimal quantities of carbonyl sulfide and, quite unexpectedly, producing only low levels of hydrogen sulfide under present operating conditions. This, in itself, is quite surprising since thermodynamic calculations of the equilibria for the reactions involved predict that very little reduction to elemental sulfur will occur. Therefore, the results, as set forth above, would not have been anticipated or expected.

Some hydrogen sulfide and/or carbonyl sulfide is formed with gas streams having low $SO_2$ and high water (>6%) concentrations, such as gas streams obtained with coal or oil-burning processes. However, the formation of such materials is within acceptable limits (considered to be much less than produced by other catalysts used for this purpose). In addition, activity of the catalyst is maintained for long periods of time, and the catalyst is resistant to poisoning by oxygen and functions in the presence of water vapor, thereby affording distinct advantages over other known catalysts used for the catalytic reduction of sulfur dioxide with a reducing gas.

In the essential aspects of the process of the present invention, the sulfur dioxide-containing gas stream is heated from the delivery temperature to a temperature in the range from about 450°C to about 700°C, or higher, if desired, and then, if necessary, mixed with additional carbon monoxide or hydrogen to provide a gaseous reaction mixture having the proper (or desired) stoichiometric balance between the reducing gas and the sulfur dioxide (and other reducible materials). Carbon monoxide in extreme excess (i.e. >10% over the stoichiometrically required amount) is to be avoided since it leads to the undesirable formation of carbonyl sulfide.

The sulfur dioxide/reducing gas gaseous stream is contacted with the catalyst of the present invention in a first converter wherein the sulfur dioxide is converted to elemental sulfur and the carbon monoxide is oxidized to carbon dioxide and/or the hydrogen is oxidized to water. The elemental gaseous sulfur which is formed is then condensed from the gas stream as the gases are cooled. If desired, the gas stream can be contacted with a second batch of catalyst in one or more further converters, after cooling to remove elemental sulfur (between each converter) to further increase the conversion efficiency of the processing system. Process parameters, materials of construction and type and size of necessary process equipment can be determined by application of those chemical and process engineering principles well-known in this field.

The catalyst is preferably treated with carbon monoxide at 700°C for about 15–45 minutes, generally about 30 minutes, at the desired flow rates of nitrogen and carbon monoxide. This preferred step, which can be, and generally is, conducted with the catalyst in place in the catalytic reactor(s), has been found to raise the catalytic activity of the catalyst to its desired maximum prior to the time when it is first contacted by the sulfur dioxide-containing gas stream. This ensures that the catalytic conversion efficiency will be at its highest even during the first few hours of contact, whereas, in contrast, without such a prereduction step, there is a definite time interval, on the order of hours, for the catalyst to reach maximum conversion efficiency for the given set of operating conditions. Thus, the prereduction step is desirable to ensure maximum conversion of sulfur dioxide to elemental sulfur at all times.

Satisfactory conversion rates have been obtained with space velocities through the catalytic reactor(s) on the order of 2,000–36,000 volumes of gas/volume of catalyst/hour, though both higher and lower space velocities, depending on the composition of the gas stream, are contemplated.

A particular advantage of the catalyst and process of this invention is that, upon temperature cycling from the desired operating temperature to a lower temperature followed by return to the desired operating temperature, the catalytic conversion returns to substantially the original conversion rate. Thus, if there is an emergency shut-down of the system or catalytic reactor(s), or other lowering of the temperature of the catalytic reactor(s), it does not become necessary to replace the catalytic material. Instead, when ready, the catalytic reactor(s) can be returned to the desired operating temperature and the catalytic material will perform substantially as well as before the temperature drop.

The catalyst of this invention can be pelletized by known techniques, such as by preparing an aqueous slurry, casting in the form of a thin sheet (⅛ inch thick) on an inert material, followed by drying and sintering at elevated temperatures. The sintered sheet is then broken into small pellets approximately ⅛ inch on an edge.

The catalyst of this invention can also be supported by known techniques as, for example, by impregnating a suitable carrier material with an aqueous solution thereof, and subsequently drying and calcining the impregnated material. Alternatively, the carrier material can be suitably loaded with the catalyst according to known dry impregnation techniques. Suitable carrier materials include, for example, zirconia, thoria, magnesia, alumina, silica-alumina, and the like, especially those having extended surface areas. After catalyst impregnation, the catalyst/support has more active sites per unit volume which promote sulfur dioxide reduction.

In an exemplary procedure, the carrier materials are sieved to −30/+60 mesh, and impregnated with aqueous solutions of cobalt nitrate and either yttrium or gadolinium nitrate, or other soluble salts, such as, for example, acetates, oxalates, and carbonates, to form, upon firing, a carrier impregnated with about 5.5% $LnCoO_3$. In a further exemplary procedure, unstabilized zirconia powders or yttrium oxide-stabilized zirconia powders are mixed with the aforementioned nitrates (or other salts) to prepare aqueous suspensions. The suspensions are extruded as ⅛ inch diameter pellets, dried and then fired at temperatures between about 900°C and 1100°C, preferably at about 900°C to about 1000°C, to yield fired pellets having a nominal 5 wt. % $LnCoO_3$ composition. Auxiliary agents, such as binders, e.g., camphor, lubricating and wetting agents, etc., can be added to the suspension to improve the extrusion or pellet forming process.

The catalysts of this invention having high surface area can also be prepared using a freeze drying technique. In this procedure, a stoichiometric mixture of solutions of soluble salts of cobalt and either yttrium and gadolinium are frozen, evaporated to remove the water and vacuum decomposed to produce a mixture of cobalt oxide and either yttrium oxide or gadolinium oxides, as the case may be. This mixture can then be fired in air to produce the desired material. Similar techniques can be used to produce the catalysts of this invention on a suitable support, e.g., zirconia.

Since the pressure drop across a pellet type fixed catalyst bed can be high and, therefore, will raise the operating cost of a catalytic reactor, honeycomb structures, such as cordierite honeycombs, can be used as supports for the catalytic material in the present invention as pressure drops therethrough are usually lower than with pellet type structures.

BRIEF DESCRIPTION OF THE DRAWING

The sole FIGURE is a schematic flow diagram for the desulfurization of flue gases from a coal-burning power plant according to this invention.

DETAILED DESCRIPTION

Referring to the FIGURE there is shown a main power plant 10 wherein high sulfur content fuel is burned in the presence of air. A high temperature ash precipitator 12, for example an electrostatic precipitator, and, if necessary, other filtering means 14, are used to remove as much as possible (preferably all) of the particulate matter from the flue gas stream. If the flue gas stream contains excess hydrogen other than that limit considered desirable, a sacrificial catalyst can be utilized in catalytic reactor 16 to remove such hydrogen to prevent (or at least limit) the subsequent formation of hydrogen sulfide. A carbon monoxide generator 18, such as a coal or oil gasifier that may be as large as about 10% of the capacity of main power plant 10, is used to furnish the carbon monoxide needed to reduce the sulfur dioxide and oxygen. Generator 18 is connected via line 20 to the flue gas stream 22 exiting from catalytic reactor 16 or, if reactor 16 is unnecessary, to the flue gas stream exiting from filter means 14. The catalytic reactor, containing the catalytic material of this invention, may be in a single stage or in multiple stages if interstage cooling is required or where a second stage is required to improve the overall efficiency of the sulfur removal process. As shown, flue gas stream 24 containing sulfur dioxide, oxygen and carbon monoxide enters interstage cooler 26 and flows countercurrently to the gas stream exiting from first stage catalytic reactor 28. After the gas stream has passed through cooler 26, catalytic reactor 28 and then cooler 26 again, the sulfur formed in reactor 28 is removed (as at 30) from the flowing stream before the gas stream enters second stage catalytic reactor 32. Since the carbon monoxide reacts exothermally with at least a part of the oxygen present, it is advantageous to recover this heat in heat removal unit 34. The sulfur collected from the resultant gas stream 36 in sulfur recovery unit 38 is combined with the sulfur removed at 30 and used as a valuable by-product of this process. After the resultant gas stream passes through precipitator 40 and compressor 42, it is exhausted through stack 44. By-pass line 46 allows the gas stream to be directly exited via stack 44 to allow, for example, for catalyst replacement, emergency shutdown of the reactor system, etc.

DESCRIPTION OF SPECIFIC EMBODIMENTS

The following Examples are given to enable those skilled in this art to more clearly understand and practice the present invention. They should not be considered as a limitation upon the scope of the invention, but merely as being illustrative and representative thereof.

EXAMPLE I 5.649 Grams of $Y_2O_3$ and 4.075 grams of $Co_2O_3$ were dry ground and blended using a mortar and pestle, and fired in air at 1100°C for 4 hours in an uncovered platinum crucible. (It should be noted that the cobalt oxide used in the preparation of these materials actually exists as a mixture of CoO and $Co_3O_4$, but this reagent grade cobalt oxide has a cobalt assay which corresponds to 101% $Co_2O_3$; accordingly, the cobalt oxide will be considered to be $Co_2O_3$.) After the sample had been oven-cooled to room temperature, it was removed from the furnace, reground with mortar and pestle, and refired at 1100°C for an additional 4 hours. After the second firing the sample was oven-cooled to room temperature, removed from the furnace, reground and sieved through a 325 mesh screen to afford a material which is predominantly $Y_2O_3$ with some cobalt oxides.

EXAMPLE II

The procedure of Example I is repeated using 9.063 grams of $Gd_2O_3$ and 4.075 grams of $Co_2O_3$ to prepare $Gd_2O_3 \cdot Co_2O_3$.

EXAMPLES III AND IV

In these Examples, a screening reactor system (described below) has been utilized to test the relative catalytic activity of the materials embraced by this invention. The system has been set to give a conversion efficiency of about 60% (instead of 100%) with the reference catalyst, thereby enabling the detection of still more effective catalyst compositions.

Three gases ($N_2$, CO, and $SO_2$) are fed to a stainless steel manifold. From the manifold the gases pass through a ⅝ inch diameter, 12 inches long, 21 element stainless steel static mixer (Kenics Corp., Danvers, Mass.), then to a reactor which consists of a 15 inch tube surrounding a ½ inch diameter, 18 inches long quartz tube having fitted joints at both ends. The catalyst sits in the reactor 4 inches above the bottom of the furnace and is supported by a small amount of fiberfrax wool. The amount of catalyst used is 0.5 grams. The effluent from the reactor system goes into a sulfur collector, a ½ inch diameter, 8 inch long pyrex tube with fitted joints at both ends. A ¼ inch tube leads to a ¼ inch stainless steel millipore filter. From the filter, the effluent passes to a Carle Automatic Sampling Valve and timer which injects samples every 10 minutes into a gas chromatograph.

The data for various catalytic compositions embraced by this invention with flow rates of 12 ml./min. of $SO_2$, 24 ml./min. of CO, and 84 ml./min. of $N_2$ (catalyst volume = 0.59 cm$^3$; contact time = 0.29 second) is tabulated in Table I below.

TABLE I

| EXAMPLE | FORMULA | PREPARATION | TEMPERATURE AT WHICH NO REACTION OCCURS | MAXIMUM COS PRODUCTION AT LOW TEMP. | % $SO_2$ REMOVED AT 700°C |
|---|---|---|---|---|---|
| III | $Y_2O_3 \cdot Co_2O_3$ | See Ex. I | 380°C | — | 67% |
| IV | $Gd_2O_3 \cdot Co_2O_3$ | See Ex. II | 470°C | 5% at 470°C | 50% |

The reference catalyst has been shown to have catalytic conversion efficiencies on the order of 90% or greater under appropriate condidtions and with properly constituted gas streams. Accordingly, 67% $SO_2$ removal for $Y_2O_3 \cdot Co_2O_3$ under conditions which are pre-set to give 60% $SO_2$ removal with the reference catalyst is indicative that $Y_2O_3 \cdot Co_2O_3$ is at least as good as the reference catalyst, and possibly slightly better, and that comparable catalytic conversion efficiencies should be attainable therewith. Thus, $Y_2O_3 \cdot Co_2O_3$ is the preferred catalytic material of this invention.

In certain instances where the said gas stream has a composition different from that set forth above or used in the Examples, the catalytic conversion efficiency may be on the order of 75% or so. However, under appropriate conditions and with properly constituted gas streams, conversion efficiencies on the order of 90% can be obtained.

While the present invention has been described with reference to specific embodiments thereof, it should be understood by those skilled in this art that various changes may be made and equivalents may be substituted without departing from the true spirit and scope of the invention. In addition, many modifications can be made to adapt a particular situation, material or composition of matter, process, process step or steps, or then-present objective to the spirit of this invention without departing from its essential teachings.

What is claimed is:

1. A process for removing sulfur dioxide from a gas stream containing sulfur dioxide comprising passing a gas stream containing sulfur dioxide and a sufficient amount of carbon monoxide or hydrogen to reduce at least a portion of said sulfur dioxide to elemental sulfur through a reaction chamber charged with a material of the formula $Ln_2O_3 \cdot Co_2O_3$, where Ln is either Y or Gd, to catalytically produce at a sufficiently elevated temperature a product stream containing elemental sulfur and carbon dioxide or water, and thereafter removing said elemental sulfur from said product stream.

2. The process of claim 1 wherein the temperature in said reaction chamber is in the range of from about 450°C to about 700°C.

3. The process of claim 1 wherein said material is $Y_2O_3 \cdot Co_2O_3$.

4. The process of claim 1 wherein said material is $Gd_2O_3 \cdot Co_2O_3$.

5. The process of claim 1 wherein said process is characterized by a sulfur dioxide removal efficiency greater than about 90%.

6. The process of claim 1 wherein said process is characterized by a sulfur dioxide removal efficiency greater than about 90% even in the presence of oxygen in said reaction chamber.

7. The process of claim 1 wherein the production of said product stream proceeds even in the presence of oxygen in said reaction chamber.

8. The process of claim 1 wherein not greater than minimal amounts of hydrogen sulfide and carbonyl sulfide are produced during the catalytic production of said elemental sulfur.

9. The process of claim 1 wherein said carbon monoxide or hydrogen in said gas stream is in an amount not greater than the stoichiometric amount thereof required for reduction of all oxidants in said gas stream.

10. The process of claim 1 wherein said carbon monoxide or hydrogen in said gas stream is within ± 15% of the stoichiometric amount required for complete reduction of all oxidants in said gas stream.

11. The process of claim 1 wherein a portion of said carbon monoxide or hydrogen in said gas stream is generated in situ.

12. The process of claim 1 wherein a portion of said carbon monoxide or hydrogen in said gas stream is added thereto from an external source.

13. A process for removing sulfur dioxide from a gas stream containing sulfur dioxide comprising adding carbon monoxide or hydrogen to a gas stream containing sulfur dioxide and oxygen to thereby provide a gaseous reaction stream, the total amount of carbon monoxide or hydrogen in said gaseous reaction stream being approximately the stoichiometric amount required for reduction of all oxidants in said gaseous reaction stream, heating said gaseous reaction stream to a temperature in the range from about 450°C to about 700°C, passing said heated gaseous reaction stream through at least one reaction chamber charged with a material represented by the formula $Ln_2O_3 \cdot Co_2O_3$, where Ln is either Y or Gd, to catalytically produce a product stream comprising elemental sulfur, carbon dioxide or water, and not greater than minimal quantities of hydrogen sulfide and carbonyl sulfide, and thereafter remving said elemental sulfur from said product stream.

14. The process of claim 13 wherein said material is $Y_2O_3 \cdot Co_2O_3$.

15. The process of claim 13 wherein said material is $Gd_2O_3 \cdot Co_2O_3$.

16. The process of claim 13 wherein said gaseous reaction stream contains a minor concentration of oxygen, and the production of said elemental sulfur proceeds even in the presence of said oxygen in said gaseous reaction stream.

17. The process of claim 13 wherein said carbon monoxide or hydrogen in said gaseous reaction stream is within ± 15% of the stoichiometric amount required for complete reduction of all oxidants in said gaseous reaction stream.

18. The process of claim 1 wherein said material is supported on a magnesia carrier.

19. The process of claim 13 wherein said material is supported on a magnesia carrier.

20. The process of claim 1 wherein said material is supported on a zirconia carrier.

21. The process of claim 13 wherein said material is supported on a zirconia carrier.

* * * * *

PO-1050
(5/69)

UNITED STATES PATENT OFFICE
CERTIFICATE OF CORRECTION

Patent No. 3,931,390      Dated January 6, 1976

Inventor(s) Frank C. Palilla, Gary G. Gaudet and Helmut Lingertat

It is certified that error appears in the above-identified patent and that said Letters Patent are hereby corrected as shown below:

Column 2, line 7, delete "to" and insert --by--;
Column 2, line 56, delete "35" and insert --$\pm$--;
Column 2, line 57, delete "35" and insert --$\pm$--;
Column 3, line 8, delete "H₂D" and insert --H₂O--;
Column 7, line 66, after "tube" insert --furnace--;
Column 8, line 31, delete "condidtions" and insert --conditions--;
Column 10, line 15, delete "remving" and insert --removing--.

Signed and Sealed this fifteenth Day of June 1976

[SEAL]

Attest:

RUTH C. MASON
Attesting Officer

C. MARSHALL DANN
Commissioner of Patents and Trademarks